United States Patent
Sebastian

(10) Patent No.: US 7,529,548 B2
(45) Date of Patent: May 5, 2009

(54) METHOD AND SYSTEM FOR ADAPTING A WIRELESS LINK TO ACHIEVE A DESIRED CHANNEL QUALITY

(75) Inventor: Peroor K. Sebastian, New Delhi (IN)

(73) Assignee: Intel Corporation, Santa Clara, CA (US)

( * ) Notice: Subject to any disclaimer, the term of this patent is extended or adjusted under 35 U.S.C. 154(b) by 28 days.

(21) Appl. No.: 09/894,448

(22) Filed: Jun. 28, 2001

(65) Prior Publication Data

US 2003/0003920 A1    Jan. 2, 2003

(51) Int. Cl.
*H04Q 7/20*   (2006.01)

(52) U.S. Cl. ............... 455/452.1; 455/63.1; 455/67.11; 455/435.1; 455/435.2; 455/452.2; 455/453; 455/501; 455/504; 455/506; 370/230.1; 370/231; 370/235; 370/310.2; 370/332; 370/333

(58) Field of Classification Search ............... 455/63.1, 455/63.11, 67.11, 422.1, 423–425, 451, 452.1, 455/452.2, 452–453, 501, 504, 506; 370/230.1, 370/231–235, 310.2, 332, 333
See application file for complete search history.

(56) References Cited

U.S. PATENT DOCUMENTS

| | | | | |
|---|---|---|---|---|
| 5,345,599 A |   | 9/1994 | Paulraj et al. ............... 455/49.1 |
| 5,557,603 A | * | 9/1996 | Barlett et al. ............... 370/228 |
| 5,857,147 A | * | 1/1999 | Gardner et al. ............ 455/67.11 |
| 5,956,642 A |   | 9/1999 | Larsson et al. ............... 455/449 |
| 6,016,311 A | * | 1/2000 | Gilbert et al. ............... 370/280 |
| 6,067,290 A |   | 5/2000 | Paulraj et al. ............... 370/329 |
| 6,253,063 B1 | * | 6/2001 | Cudak et al. ............... 455/63.1 |
| 6,411,613 B1 | * | 6/2002 | Seymour et al. ............ 370/347 |
| 6,542,736 B1 | * | 4/2003 | Parkvall et al. ............. 370/465 |
| 6,574,797 B1 | * | 6/2003 | Naegeli et al. .............. 725/120 |
| 6,859,443 B1 | * | 2/2005 | Mushkin ..................... 370/324 |

FOREIGN PATENT DOCUMENTS

CA    GB-2321822    *   5/1998

* cited by examiner

*Primary Examiner*—Stephen M D'Agosta
(74) *Attorney, Agent, or Firm*—Alan Pedersen-Giles

(57) ABSTRACT

Adapting a wireless communications link between a transmitter and a receiver involves reducing the RF bandwidth of an uplink communications channel to achieve a desired channel quality. The RF bandwidth of the uplink communications channel is reduced when the desired channel quality is not achieved using the entire available RF bandwidth for uplink communications. Reducing the RF bandwidth of an uplink channel enables the uplink limit of a subscriber unit to be extended beyond what is possible when the entire available RF bandwidth is used for uplink communications. Additional uplink time slots can be allocated to the uplink communications channel with the reduced RF band so that a constant overall transmission rate can be maintained between the transmitter and the receiver.

26 Claims, 7 Drawing Sheets

METHOD AND SYSTEM FOR ADAPTING A WIRELESS LINK TO ACHIEVE A DESIRED CHANNEL QUALITY

FIELD OF THE INVENTION

The invention relates generally to wireless communications systems that use multiple access protocols. More particularly, the invention relates to a method and system for adapting a wireless link between a transmitter and receiver pair in a wireless communications system.

BACKGROUND OF THE INVENTION

Wireless communications systems use multiple access protocols to enable wireless communications between base transceiver stations and multiple subscriber units. Typically, a wireless communications system includes multiple base transceiver stations that are spaced apart to create subscriber cells. Subscriber units within the subscriber cells exchange information between nearby base transceiver stations over dedicated radio frequencies.

The use of wireless communications systems is rapidly expanding beyond the exchange of voice communications to include the exchange of broadband data, such as multimedia data. For example, a single wireless link between a base transceiver station and a subscriber unit may be utilized to simultaneously exchange voice, video, and data. In order to effectively deliver broadband services over a wireless link, the wireless link must be able to communicate at a higher rate than traditional voice-only wireless links. One technique that has been utilized to increase the communications rate of wireless links involves increasing the RF bandwidth that is used to transmit information between a base transceiver station and a subscriber unit. For example, where a traditional voice-only wireless link utilizes 200 kHz of RF bandwidth, a broadband wireless link may utilize 6 MHz of RF bandwidth. Although larger RF bandwidth enables an increased communications rate over a wireless link, the larger RF bandwidth also leads to larger thermal noise at the RF receiver. As is known in the field of RF communications, the thermal noise, N, at a receiver is expressed as:

$$N = K \cdot T \cdot B$$

where: K=Boltzman constant
T=ambient temperature in degrees Kelvin, and
B=the RF bandwidth of the communications channel From the above expression, it can be seen that the thermal noise, N, is directly proportional to the RF bandwidth of the communications channel and is expressed as:

$$N \propto B$$

Because wireless frequency bandwidth is a limited resource, wireless cellular systems often reuse the same wireless frequencies in different subscriber cells. Although the reuse of wireless frequencies in different subscriber cells frees up available bandwidth, the reuse of wireless frequencies also causes co-channel interference when signals from one subscriber cell are detected within another subscriber cell. The effects of co-channel interference can be controlled by ensuring that the same frequency is only reused in cells that are spaced apart by a sufficient distance. The magnitude of co-channel interference in subscriber cells is reduced by attenuation as electromagnetic waves from interfering channels travel the distance between co-channel cells. The way in which frequencies are reused in a wireless communications system (also referred to as the frequency reuse structure) depends on many factors including the number of subscriber cells that are in a particular cluster of cells. The co-channel interference (often measured as the signal to interference ratio, SIR) at a particular receiver is directly effected by the frequency reuse structure.

One important operating characteristic of receivers in wireless communications systems is the signal to interference and noise ratio (SINR). The SINR is defined as:

$$SINR = C/(I+N)$$

where: C is the received channel signal,
I is the co-channel interference, and
N is the thermal noise.

As stated above, the co-channel interference, I, at a receiver is directly effected by the frequency reuse structure of a wireless communications system and the thermal noise, N, at a receiver is directly proportional to the RF bandwidth of a wireless link. The signal strength, C, of a received signal depends on the distance between the transmitter and the receiver for a given transmitter power. As the distance between a transmitter and a receiver increases, the value of C decreases, which in turn results in a reduction of the SINR at the receiver. Because the channel to interference ratio (C/I) is relatively unaffected by the distance between a transmitter and a receiver, the reduction in SINR is primarily caused by a reduction in the signal to noise ratio (SNR) of a received signal, where SNR=C/N.

For successful operation of receivers in a wireless communications system, the value of SINR should be above a minimum threshold. Typically, the minimum threshold of SINR for a wireless link is a design parameter that is fixed by one or more of the required bit error rate (BER), the required packet error rate (PER), the coding rate, the modulation rate, and the channel conditions. Given the minimum SINR threshold, the effective size of a subscriber cell in a wireless communications system is set by the maximum distance between a transmitter and a receiver that can be achieved while maintaining the SINR above the minimum threshold. Because the C/I ratio is relatively unaffected by the distance between a transmitter and a receiver, the effective size of a subscriber cell is a function of the SNR of a received signal.

As stated above, the SINR is a design parameter that is fixed by one or more of the required bit error rate (BER), the required packet error rate (PER), the coding rate, the modulation rate, and the channel conditions. Further, the channel signal strength, C, is typically set by the transmitter characteristics. With regard to communications in the downlink direction, from a base transceiver station to a subscriber unit, the channel signal strength, C, can be increased as necessary, within regulatory limits, to maintain a given SINR in view of increased thermal noise that results from a larger RF bandwidth. However, with regard to communications in the uplink direction, from a subscriber unit to a base transceiver station, the channel signal strength, C, is limited by many factors and cannot be easily increased to compensate for an increase in thermal noise. For example, the channel signal strength of uplink transmissions is limited by power consumption concerns at the subscriber unit (particularly in mobile subscriber units), the cost of high power components (such as power amplifiers and filters), government regulations, and human health concerns.

Because of the limitations in uplink transmission power, the effective size of a wireless subscriber cell is often uplink limited. That is, as the distance between a subscriber unit and a base transceiver station increases, the channel signal strength decreases until finally the SINR drops below the minimum threshold. If a subscriber unit exceeds its uplink limit (also referred to as the noise limit) such that the SINR drops below the minimum threshold, the quality of service experienced at the subscriber unit drops accordingly. A reliable quality of service for each subscriber unit is a critical characteristic of a wireless communications system.

In addition to effecting the quality of service delivered to subscriber units in a wireless communications system, the uplink limit of a wireless link also defines the maximum size of a wireless cell. The maximum size of the wireless cell in turn effects the capital costs of building a wireless communications system.

In view of the relationship of the RF bandwidth to receiver noise and the limitations on uplink transmission strength, what is needed is a broadband wireless communications system that can adapt to deliver a constant quality of service to a subscriber unit.

SUMMARY OF THE INVENTION

A method and system for adapting a wireless communications link between a transmitter and a receiver involves reducing the RF bandwidth of an uplink communications channel to achieve a desired channel quality. The RF bandwidth of the uplink communications channel is reduced when the desired channel quality is not achieved using the entire available RF bandwidth for uplink communications. Reducing the RF bandwidth of an uplink channel enables the uplink limit of a subscriber unit to be extended beyond what is possible when the entire available RF bandwidth is used for uplink communications. In an embodiment, additional uplink time slots are allocated to the uplink communications channel with the reduced RF band so that a constant overall transmission rate can be maintained between the transmitter and the receiver.

In an embodiment of a method for adapting a wireless communications link between a transmitter and a receiver, information is communicated in a downlink direction from a base transceiver station to multiple subscriber units and in an uplink direction from said multiple subscriber units to said base transceiver station. The method involves establishing a radio frequency (RF) bandwidth as a communications channel in a wireless communications system, establishing a desired channel quality for uplink communications between said transmitter and said receiver over said communications channel, and reducing said RF bandwidth of said communications channel for uplink communications to achieve said desired channel quality.

In an embodiment of the method, reducing the RF bandwidth is preceded by determining a current channel quality for uplink communications between said transmitter and said receiver over said communications channel, and utilizing all of said RF bandwidth of said communications channel for uplink communications if said current channel quality meets said desired channel quality, or reducing said RF bandwidth of said communications channel to achieve said desired channel quality and utilizing said reduced RF bandwidth of said communications channel for uplink communications if said current channel quality does not meet said desired channel quality.

An embodiment of the method further includes allocating additional uplink time slots for uplink communications over said communications channel with said reduced RF bandwidth to maintain a desired uplink transmission rate between said transmitter and said receiver over said communications channel with said reduced RF bandwidth. In an embodiment, allocating additional uplink time slots includes taking time slots from other uplink communications channels to compensate for said additional uplink time slots that are allocated to said uplink communications channel with said reduced RF bandwidth.

In an embodiment of the method, the frequency range of the reduced RF bandwidth, that is to be used for subsequent uplink transmissions, is indicated to said transmitter and changes in time slot allocations, as a result of the uplink channel with the reduced RF bandwidth, are indicated.

In an embodiment of the method, time division duplexing is utilized for downlink and uplink communications.

In an embodiment of the method, the RF bandwidth for downlink communications is greater than the RF bandwidth for uplink communications.

In an embodiment of the method, reducing said RF bandwidth includes dividing said RF bandwidth into uplink sub-channels and assigning at least one of said uplink sub-channels to said transmitter for uplink communications. In a further embodiment, the RF bandwidth is divided into n uplink sub-channels of equal RF bandwidth size, where n is an integer. In another embodiment, the a desired signal-to-noise ratio is established as said desired channel quality for uplink communications and a number, m, of uplink sub-channels is assigned to said communications channel such that said desired signal-to-noise ratio is met for uplink communications, wherein m is an integer.

In an embodiment of the method, the frequency range of the reduced RF bandwidth, that is to be used for subsequent transmissions, is indicated to said transmitter.

In an system for adapting a wireless communications link between a transmitter and a receiver in a wireless communications system, information is communicated in a downlink direction from a base transceiver station to multiple subscriber units and in an uplink direction from said multiple subscriber units to said base transceiver station. Additionally, the wireless communications system has an established communications channel with a known RF bandwidth and a desired channel quality in the uplink direction. The system includes the ability to reduce said RF bandwidth of said communications channel for uplink communications between said transmitter and said receiver to achieve said desired channel quality if said desired channel quality will not be achieved using all of said RF bandwidth of said communications channel for uplink communications.

In an embodiment, the system also reduces allocates additional uplink time slots for uplink communications over said uplink communications channel to Maintain a desired uplink transmission rate between said transmitter and said receiver over said uplink communications channel with said reduced RF bandwidth.

Another embodiment of a method for adapting a wireless communications link between a transmitter and a receiver involves identifying a radio frequency (RF) bandwidth that is available for use as a communications channel in a wireless communications system, establishing a desired channel quality for uplink communications between said transmitter and said receiver over said communications channel, and selecting a portion of said RF bandwidth that enables said desired channel quality to be met for uplink communications. Other aspects and advantages of the present invention will become apparent from the following detailed description, taken in conjunction with the accompanying drawings, illustrating by way of example the principles of the invention.

DETAILED DESCRIPTION OF THE INVENTION

As shown in the figures for purposes of illustration, the invention is embodied in a system and method for wireless communications that adapts a wireless communications link between a transmitter and a receiver by reducing the RF bandwidth of an uplink communications channel to achieve a desired channel quality. The RF bandwidth of the uplink communications channel is reduced when the desired channel quality is not achieved using the entire available RF bandwidth for uplink communications. Reducing the RF bandwidth of an uplink channel enables the uplink limit of a subscriber unit to be extended beyond what is possible when the entire available RF bandwidth is used for uplink communications.

Figure 1:
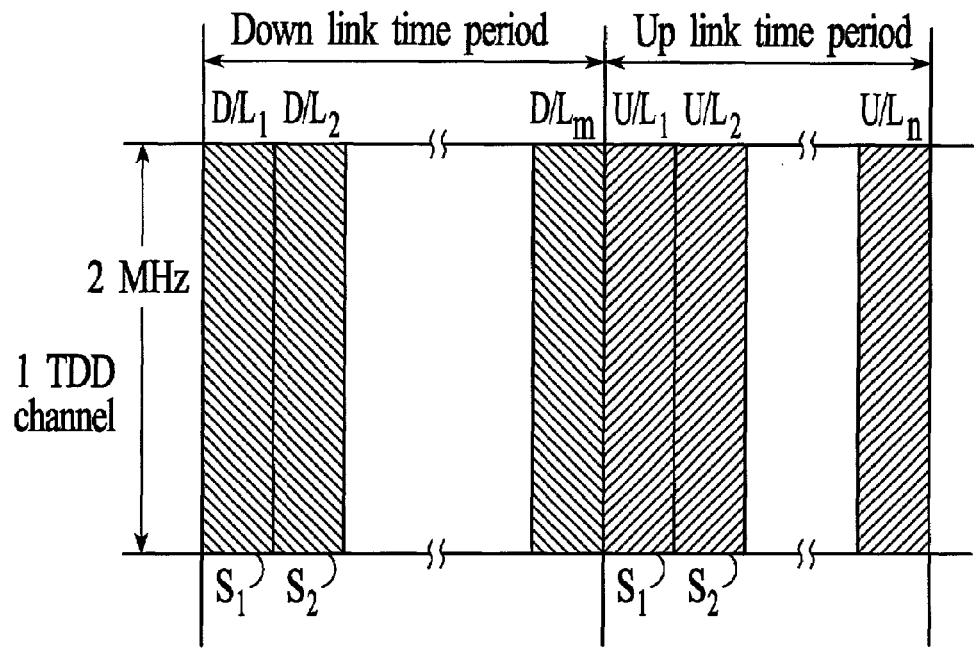
FIG. 1 depicts the RF bandwidth of an example prior art broadband wireless channel that is utilized between a transmitter and a receiver.

FIG. 1 depicts the RF bandwidth of an example broadband wireless channel that is utilized between a transmitter and a receiver. In the example of FIG. 1, the channel has an RF bandwidth of 2 MHz that is located in the 2.5 to 2.502 GHz frequency range. As described above, the maximum separation distance between the transmitter and the receiver is a function of the desired signal-to-noise ratio, SNR, the channel signal strength, C, and the thermal noise, N, where the channel signal strength is limited in the uplink direction and the thermal noise is directly proportional to the size of the channel's RF bandwidth.

Time division duplexing (TDD) is a two-way communications protocol that is commonly used in wireless communications systems. In a TDD wireless system, the same frequency channel is partitioned into downlink time periods and uplink time periods as depicted in FIG. 1. During the downlink time periods, information is transmitted in the downlink direction from a base transceiver station to subscriber units and during the uplink time periods, information is transmitted in the uplink direction from subscriber units to a base transceiver station. The downlink and uplink time periods are further divided into time slots that can be used by different subscriber units as communications channels according to a time division multiple access (TDMA) protocol. Subscriber-specific channels are created within the TDD channel shown in FIG. 1 by dividing the uplink and downlink time periods into downlink time slots (D/L$_1$, D/L$_2$, ... D/L$_m$) and uplink time slots (U/L$_1$, U/L$_2$, ... U/L$_n$). In the embodiment of FIG. 1, channel 1, which includes downlink time slot D/L$_1$ and uplink time slot U/L$_1$, is allocated to subscriber unit 1 (S$_1$) and channel 2, which includes downlink time slot D/L$_2$ and uplink time slot U/L$_2$, is allocated to subscriber unit 2 (S$_2$) and so on. In typical TDD-TDMA systems, the downlink and uplink transmission rates are effected by the number of time slots that are allocated to downlink and uplink transmissions per unit of time. In an embodiment, the downlink and uplink time slots are allocated to subscriber units in order to meet certain criteria such as data traffic requirements and traffic contracts.

As described above, the maximum effective separation distance between a base transceiver station and a subscriber unit is typically uplink limited and the thermal noise at the uplink receiver is directly proportional to the RF bandwidth used for uplink communications. In order to reduce the thermal noise at the uplink receiver and extend the maximum effective separation distance between a base transceiver station and a subscriber unit, the RF bandwidth of the channel is reduced for uplink transmissions. In an embodiment, the RF bandwidth of the uplink channel is reduced by an amount that achieves a desired channel quality, with the desired channel quality being a desired signal-to-noise ratio or a desired signal to interference and noise ratio during uplink communications. That is, if a subscriber unit exceeds its uplink limit when utilizing the full RF bandwidth of an uplink channel, then the RF bandwidth of the uplink channel is reduced to a level that achieves the desired channel quality. Although the RF bandwidth of the uplink channel is reduced, the entire RF bandwidth continues to be utilized for downlink communications.

Although reducing the RF bandwidth of an uplink channel reduces the thermal noise and extends the maximum effective separation distance between the transmitter and receiver, the reduction in the RF bandwidth for uplink communications also reduces the instantaneous transmission rate that is possible in the uplink direction. A technique for delivering a constant quality of service while using an uplink channel with a reduced RF bandwidth is described in more detail below.

Figure 2:
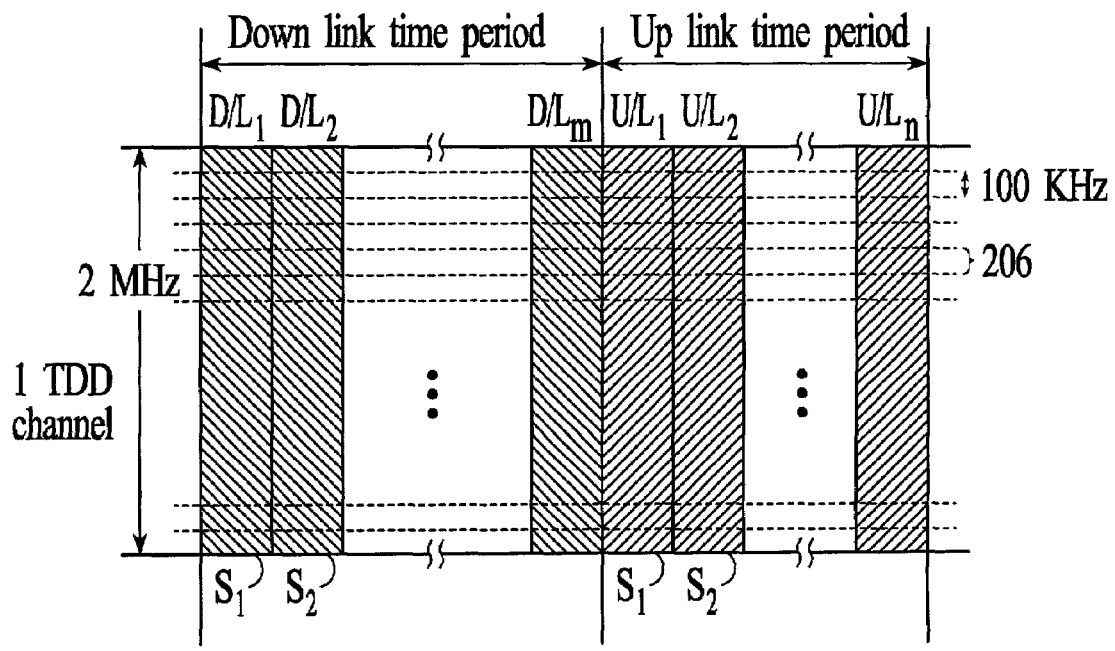
FIG. 2 depicts a broadband wireless channel that is divided into sub-channels for uplink communications in accordance with an embodiment of the invention.

In an embodiment, the RF bandwidth of the uplink channel is reduced as described with reference to FIG. 2. As shown in FIG. 2, the 2 MHz channel from FIG. 1 is divided or "sliced" into sub-channels 206. For example, the 2 MHz channel may be divided into twenty 100 kHz sub-channels. A single sub-channel, or a group of contiguous sub-channels, can then be utilized as the communications channel in the uplink direction. The RF bandwidth for the uplink channel is selected such that the desired channel quality is achieved under the given set of operating conditions. For example, with a fixed signal-to-noise ratio requirement, SNR, and a fixed channel signal strength, C, the RF bandwidth of the uplink channel is reduced until the resulting thermal noise enables the required SNR to be met. Although sub-channels of equal size are depicted in FIG. 2, the sub-channels may be divided into unequal size sub-channels.

In an embodiment, the communications channel is divided into an integer number, n, of sub-channels with the RF bandwidth, $B_n$, of each sub-channel being expressed as:

$$B_n = B_{total}/n$$

where: $B_{total}$=the total RF bandwidth of the communications channel

In an embodiment, the RF bandwidth of the uplink channel is established by assigning a number of sub-channels, m, to create the uplink channel. Given m sub-channels, the RF bandwidth for the uplink channel, $B_{UL}$, is expressed as:

$$B_{UL} = m \cdot B_n = m \cdot B_{total}/n$$

In an embodiment, m is an integer.

The maximum uplink RF bandwidth is a function of the desired channel quality, for example, the desired signal-to-noise ratio, $SNR_d$, and the received channel signal strength, C, under the current operating conditions. The desired signal-to-noise ratio is expressed as:

$$SNR_d = C/N_{max}$$

where: $N_{max}$ is the maximum amount of thermal noise allowed to meet $SNR_d$, and where $N_{max}$ is expressed as:

$$N_{max} = K \cdot T \cdot B_{UL}$$

Given the above expressions, the total number of sub-channels, m, which can be assigned to an uplink channel that has exceeded its uplink limit is expressed as:

$$m \leq (n/B_{total}) \cdot N_{max}/KT$$

Figure 3:
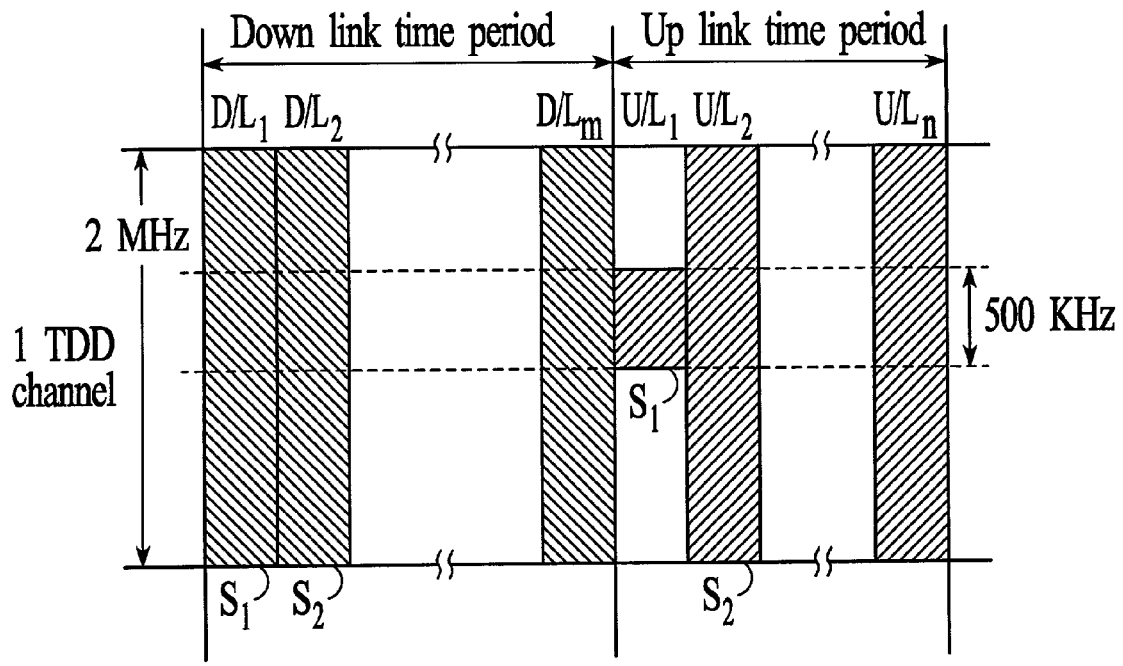
FIG. 3 depicts an example of the wireless communications channel of FIG. 2 that has been modified to include a reduced RF bandwidth for uplink channel 1 (U/L$_1$) in accordance with an embodiment of the invention.

FIG. 3 depicts an example of the wireless communications channel of FIG. 2 that has been modified to include a reduced RF bandwidth for the uplink channel that is utilized by subscriber unit $S_1$. Referring to FIG. 3, subscriber unit 1 utilizes uplink time slot 1 ($U/L_1$) and transmits at a reduced RF bandwidth (i.e., 500 kHz) during uplink time slot 1. The reduced RF bandwidth of the uplink channel for subscriber unit $S_1$ enables a desired channel quality (e.g. a desired signal-to-noise ratio or a desired signal to interference and noise ratio) to be achieved because the thermal noise is reduced at the uplink receiver. As described above with reference to FIG. 2, TDD and TDMA are utilized on the 2 MHz communications channel.

In the example of FIG. 3, downlink time slots 1 and 2 ($D/L_1$ and $D/L_2$) are allocated to subscriber units $S_1$ and $S_2$ respectively and the entire RF bandwidth of the 2 MHz channel is utilized by the subscriber unit for downlink communications. Subscriber unit $S_2$ is allocated uplink time slot 2 ($U/L_2$) and the entire RF bandwidth of the 2 MHz channel is utilized for subscriber unit 2 for uplink communications during time slot 2. In order to reduce the thermal noise and achieve the desired channel quality for an uplink channel that has exceeded its noise limit, the bandwidth that is utilized by subscriber unit $S_1$ for uplink transmissions is reduced to 500 kHz, or 5 contiguous 100 kHz sub-channels. In the embodiment of FIG. 3, it is assumed that subscriber unit $S_1$ has exceeded the uplink limit of the 2 MHz channel and that subscriber unit $S_2$ has not exceeded the uplink limit of the 2 MHz channel.

Figure 4:
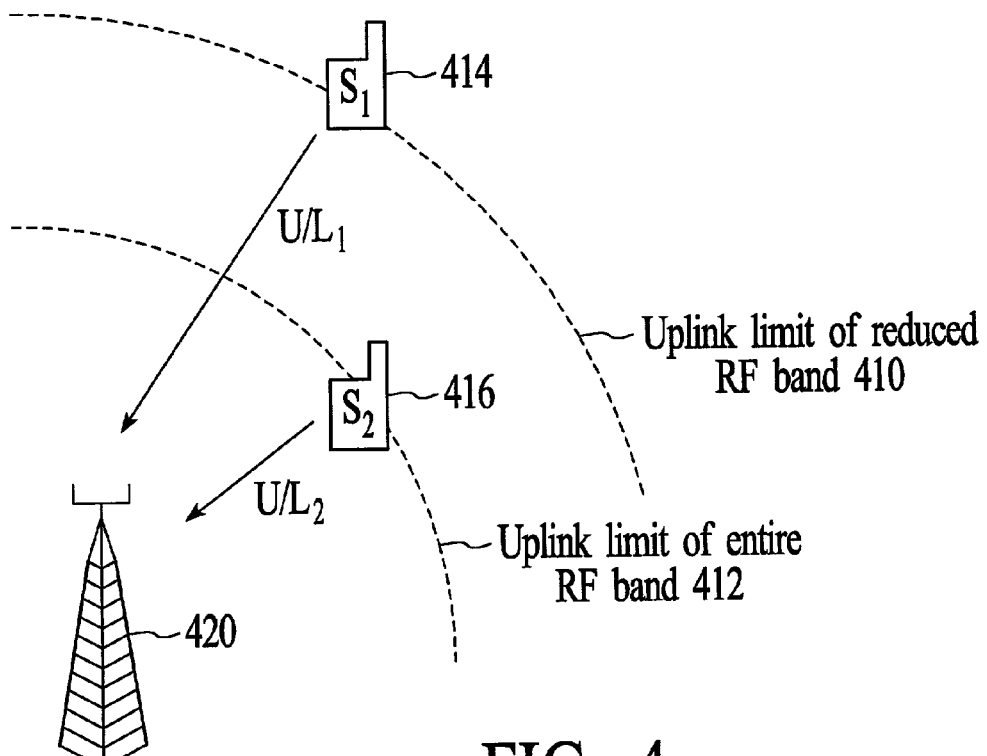
FIG. 4 depicts the relative uplink limits of uplink channel 1, which utilizes a reduced RF bandwidth of the available channel as shown in FIG. 3, and uplink channel 2, which utilizes the entire RF bandwidth of the available channel.

FIG. 4 depicts the relative uplink limits 410 and 412 of two subscriber units 414 and 416, where subscriber unit 414 (i.e., $S_1$ from FIG. 3) utilizes a reduced RF bandwidth of the available channel and subscriber unit 416 (i.e., $S_2$ from FIG. 3) utilizes the entire RF bandwidth of the available channel. In FIG. 4 it is assumed that both uplink channels must maintain the same signal-to-noise ratio and that the subscriber units have the same transmitter power. Because the RF bandwidth for subscriber unit $S_1$ is reduced, the desired signal-to-noise ratio can be achieved for both uplink channels even though subscriber unit $S_1$ is at a greater distance from the base transceiver station 420 (causing a lower channel signal strength).

Although reducing the RF bandwidth of the uplink channel increases the range of a subscriber unit as depicted in FIG. 4, the reduced RF bandwidth also has the effect of reducing the transmission rate that can be achieved during the uplink time slots. That is, with less RF bandwidth, the instantaneous transmission rate is less than can be achieved using the entire available RF bandwidth.

In a time divided system, as depicted in FIGS. 2 and 3, the overall transmission rate achieved in the downlink or uplink direction is directly proportional to the RF bandwidth, B, of the channel multiplied by the number of time slots per unit time. The overall transmission rate can be expressed as:

$$\text{transmission rate} \propto B \cdot \text{number of time slots per unit time}$$

In an embodiment, a constant overall transmission rate can be maintained on an uplink channel for a subscriber unit with a reduced RF bandwidth by allocating additional upstream time slots for uplink transmission. That is, although the instantaneous transmission rate is reduced because of the reduced RF bandwidth, the number of time slots available to the uplink channel for transmission per unit time is increased to the point that the overall transmission rate achieved over the uplink channel is maintained.

Figure 5:
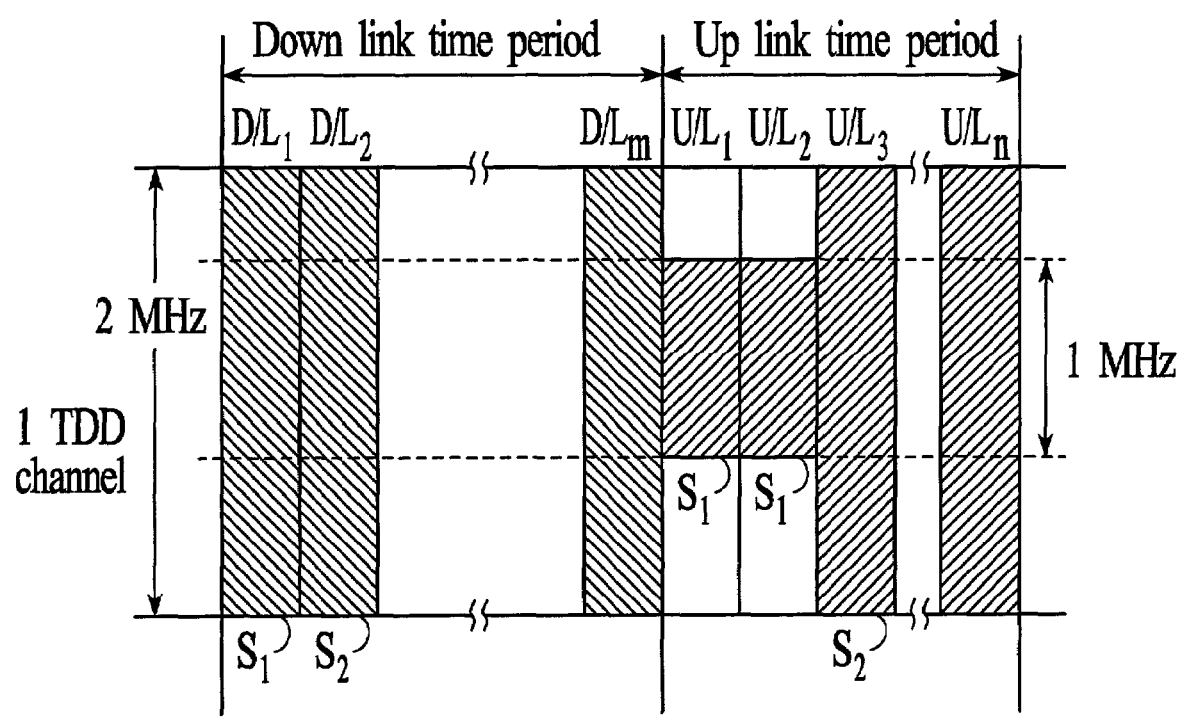
FIG. 5 depicts a wireless channel similar to the channel in FIG. 3 in which additional uplink time slots have been allocated to the uplink channel (U/L$_1$) with the reduced RF bandwidth to maintain a constant overall transmission rate in accordance with an embodiment of the invention.

FIG. 5 depicts a wireless channel that is similar to the channel in FIGS. 2 and 3 in which an additional uplink time slot ($U/L_2$) has been allocated to subscriber unit $S_1$. As depicted in FIG. 5, subscriber unit $S_1$ utilizes a reduced RF bandwidth (for example 1 MHz) for uplink transmissions during its allocated time slots (time slots $U/L_1$ and $U/L_2$). Note that subscriber unit $S_2$ has been allocated uplink time slot 3 in the embodiment of FIG. 5. Although subscriber unit $S_1$ has a reduced RF bandwidth, the additional allocated time slot enables the overall uplink transmission rate to be maintained constant. In an embodiment, additional uplink time slots are allocated on a per frame basis. In another embodiment, uplink time slots can be allocated on a per multiple frame basis in order to maintain the overall transmission rate.

In a wireless communications system that is fully, or nearly fully, utilized by multiple subscriber units, allocating additional time slots to some subscriber units for uplink communications may require taking time slots from other subscriber units. In an embodiment, time slots are taken from subscriber units that have relatively high signal-to-noise ratios. Time slots are taken from subscriber units that have relatively high signal-to-noise ratios because the subscriber units can achieve higher instantaneous data rates utilizing the entire bandwidth of the uplink channel and through other means such as higher modulation and coding rates. The higher instantaneous data rates enable the subscriber units with relatively high signal-to-noise ratios to utilize fewer time slots while still maintaining the required quality of service.

As described with reference to FIGS. 2-5, the RF bandwidth and the allocation of time slots for an uplink channel can be adapted to maintain a constant channel quality and ultimately a constant quality of service for the end user. In an embodiment, the uplink channels adapt to changing conditions in a relatively short period of time. For example, if a mobile subscriber unit exceeds its uplink limit while a wireless link is active, the RF bandwidth and time slot allocation are adapted on the fly without interaction by an end user to achieve and maintain the desired signal-to-noise ratio.

Figure 6:
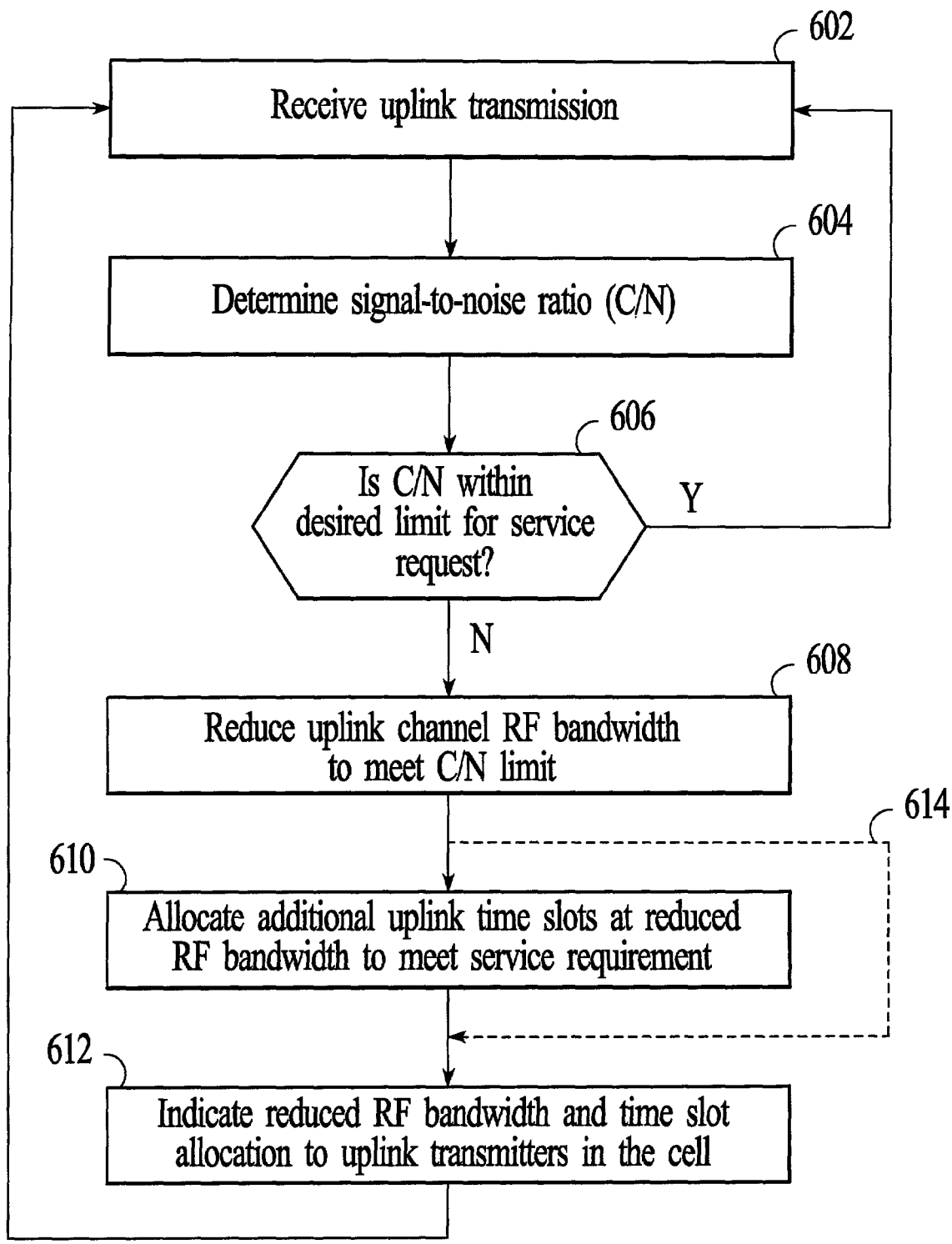
FIG. 6 is a process flow diagram for adapting a wireless link by reducing the RF bandwidth of an uplink channel in accordance with an embodiment of the invention.

A process flow diagram for adapting a wireless link using the above-described technique is depicted in FIG. 6. At step 602, an uplink transmission is received. At step 604, the channel signal-to-noise ratio for the received transmission is determined. At decision point 606, if the determined signal to-noise ratio is within the desired signal-to-noise ratio limit needed to meet a service requirement, then the uplink channel is unchanged and additional uplink transmissions are received. If the determined signal-to-noise ratio is not within the desired signal-to-noise ratio limit needed to meet the service requirement, then at step 608 the RF bandwidth of the uplink channel is reduced until the desired signal-to-noise limit is met. At step 610, additional uplink time slots are allocated to the uplink channel to meet the service requirement. At step 612, the reduced RF bandwidth and the time slot allocation are indicated to uplink transmitters in the cell and the process is repeated. In an alternative embodiment, as depicted by dashed line 614, it may not always be necessary to allocate additional uplink time slots to a channel with a reduced RF bandwidth.

Figure 7:
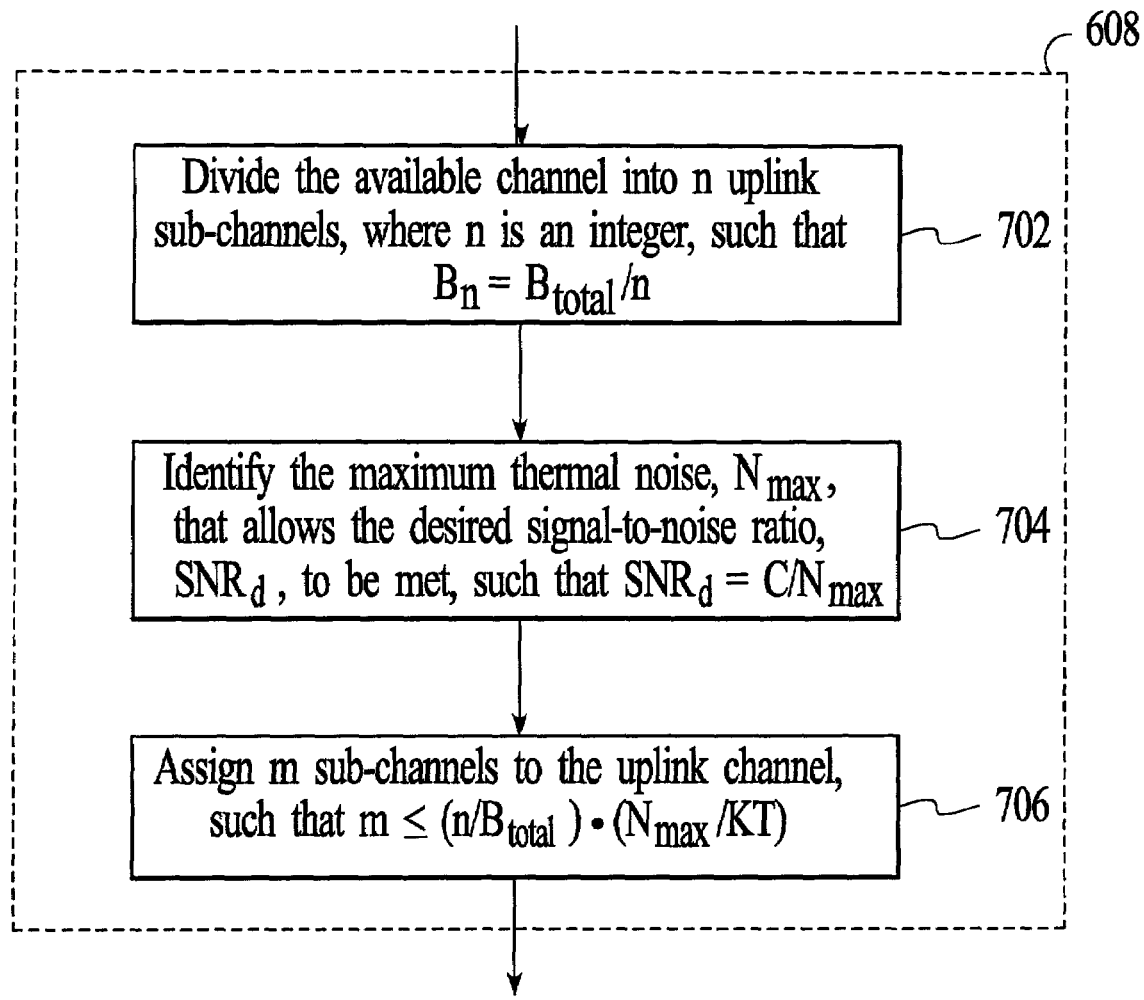
FIG. 7 represents an expanded view of step 608 in FIG. 6 in accordance with an embodiment of the invention.

FIG. 7 represents an expanded view of an embodiment of step 608 in FIG. 6. In the embodiment, at step 702, the available channel is divided into n uplink sub-channels, where n is an integer, such that $B_n=B_{total}/n$. At step 704, the maximum thermal noise, $N_{max}$, that allows the desired signal-to-noise ratio, $SNR_d$, to be met is identified, such that $SNR_d=C/N_{max}$. At step 706, m sub-channels are assigned to the uplink channel, such that $m \leq (n/B_{total}) \cdot N_{max}/KT$.

Figure 8:
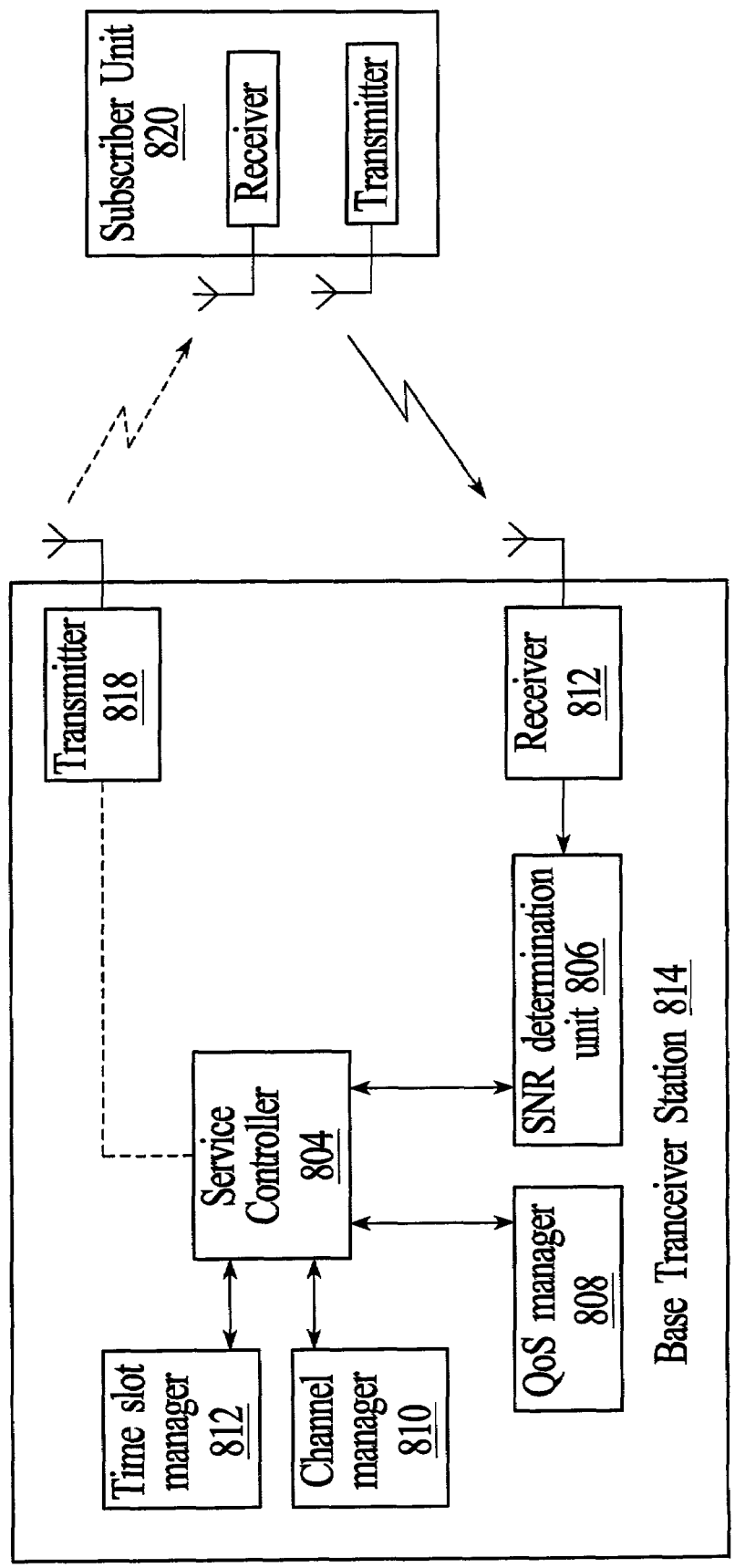
FIG. 8 depicts an embodiment of a system for adapting a wireless link by reducing the RF bandwidth of an uplink communications channel in accordance with an embodiment of the invention.

FIG. 8 depicts an embodiment of a system for adapting a wireless link as described above. In the embodiment, the system includes a service controller 804, a signal-to-noise ratio determination unit 806, a quality-of-service (QoS) manager 808, a channel manager 810, and a time slot manager 812. In an embodiment, the system is located within a base transceiver station 814 and utilizes the receiver 816 and the transmitter 818 within the base transceiver station. In an alternative embodiment, the system is located within a mobile switching center (MSC) and is connected to the base transceiver station by a land line connection. In an embodiment, the signal-to-noise ratio determination unit receives signals from subscriber units and determines the signal-to-noise ratios of the received signals. The signal-to-noise ratio determination unit supplies the signal-to-noise information to the service controller and stores signal-to-noise ratio data as necessary. In an embodiment, the signal-to-noise ratio determination unit stores historical signal-to-noise ratio data that can be used in link adaptation. In an embodiment, the QoS manager supplies the required quality of service for a link to the service controller. In an embodiment, the required quality of service is supplied in terms of, for example, a desired signal-to-noise ratio, a required transmission rate, a BER, a PER, or a combination thereof. The channel manager supplies channel information to the service controller. In an embodiment, the channel manager identifies the size and number of available sub-channels to the service controller. In an alternative embodiment, the channel manager identifies the distribution of sub-channels within a cell or a network of cells so that adjacent channel interference (ACI) can be taken into consideration when sub-channels are assigned for uplink communications. In an embodiment, sub-channels can be assigned to subscriber units such that contiguous sub-channels are only assigned to subscriber units that are separated by an acceptable distance. The time slot manager supplies the distribution of time slots to the service controller so that overlapping time slots are not allocated to different subscriber units. For example, if additional time slots are added to an uplink channel, the time slot manager can take away an equal number of time slots from other uplink channels in order to compensate for the added time slots.

The service controller 804 utilizes all of the information supplied from the above-identified units to adapt the uplink channels of subscriber units in a cell to achieve and maintain the desired quality of service as described above with reference to FIGS. 3-7. Specifically, the service controller determines by how much an uplink RF bandwidth must be reduced when the uplink limit has been exceeded and how many additional time slots must be assigned to the reduced uplink channel to meet the quality of service requirement.

In operation, a signal is received from a subscriber unit 820 and the signal-to-noise ratio for the received signal is determined by the signal-to-noise ratio determination unit 806. The service controller 804 utilizes the measured signal-to-noise ratio of the received signal and compares it to a desired signal-to-noise ratio to determine if the RF bandwidth needs to be reduced to meet the desired signal-to-noise ratio. If the RF bandwidth needs to be reduced, the service controller determines the appropriate reduced RF bandwidth. The service controller also determines if any additional time slots need to be allocated to the uplink channel to maintain all quality of service requirements. Once the service controller determines the new uplink channel configuration (e.g., RF bandwidth and number of time slots per frame or per multiple frames), the new uplink channel configuration is identified to the subscriber units in the cell using the downlink channel. The RF bandwidth of the effected uplink channel adapts in response to the service controller and the subscriber units in the cell adjust their time slot usage as necessary to meet the new time slot allocation.

In an embodiment, sub-channels are assigned to subscriber units based on previously gathered response information. In an embodiment, the subscriber units feed back to the service controller an index of the best-suited sub-channels and if an uplink channel needs to be reduced, the sub-channel(s) is selected from the index. In a TDD system, the subscriber units can learn the best-suited sub-channels via the downlink channel. In an embodiment, the selection of sub-channels is carried out to achieve diversity gain in a multi-path fading communication channel.

Figure 9:
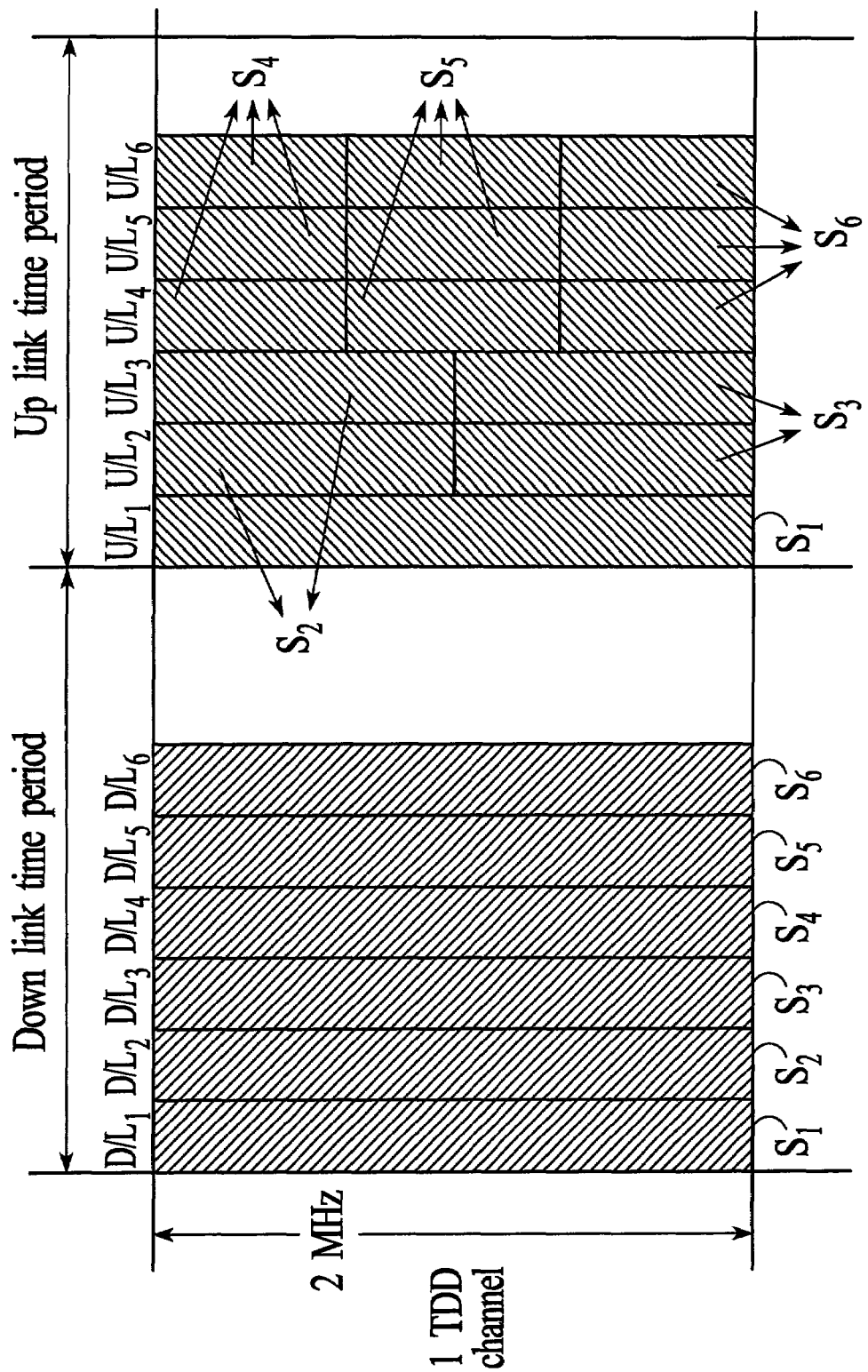
FIG. 9 depicts a wireless channel similar to the channel in FIG. 3 in which additional uplink time slots have been allocated to the uplink channels with reduced RF bandwidths to maintain a constant overall transmission rate in accordance with an embodiment of the invention.

In an embodiment, as shown in FIG. 9, the wireless communication system uses a multi-carrier modulation scheme with a 2 MHz downlink channel that is divided into time slots $D/L_1$, $D/L_2$, $D/L_3$, $D/L_4$, $D/L_5$, $D/L_6$, which are allocated to subscriber units $S_1$, $S_2$, $S_3$, $S_4$, $S_5$, $S_6$ respectively for downlink communication. For example purposes, it is assumed that subscriber unit $S_1$ has not reached its uplink limit with the 2 MHz channel and therefore utilizes the entire 2 MHz bandwidth for uplink communications during its allocated time slot, time slot 1 ($U/L_1$). Subscriber units $S_2$, $S_3$, $S_4$, $S_5$, $S_6$ have reached their uplink limits because they are not able to achieve the desired channel quality when they use the entire 2 MHz channel bandwidth. As shown in FIG. 9, subscriber unit $S_2$ is allocated 1 MHz of channel bandwidth (i.e., the upper portion of the 2 MHz channel bandwidth) during uplink time slots 2 and 3 ($U/L_2$ & $U/L_3$). Likewise, subscriber unit $S_3$ is allocated 1 MHz of channel bandwidth (i.e., the lower portion of the 2 MHz channel bandwidth) during uplink time slots 2 and 3 ($U/L_2$ & $U/L_3$). Subscriber unit $S_4$ is allocated 666.67 kHz of channel bandwidth (i.e., the upper one third portion of the 2 MHz of channel bandwidth) during uplink time slots 4, 5, and 6 ($U/L_4$, $U/L_5$ and $UIL_6$), subscriber unit $S_5$ is allotted 666.67 kHz of channel bandwidth (i.e., the middle one third portion of the 2 MHz channel bandwidth) during uplink time slots 4, 5, and 6 (U/L$_4$, U/L$_5$ and U/L$_6$), and subscriber unit S$_6$ is allotted 666.67 kHz of channel bandwidth (i.e., the lower one third portion of the 2 MHz channel bandwidth) during uplink time slots 4, 5, and 6 (U/L$_4$, U/L$_5$ and U/L$_6$). By allocating different reduced RF bands to different subscriber units, uplink time slots can be efficiently utilized as shown in FIG. 9. In the example of FIG. 9, the product of the bandwidth of the uplink channel and each number of time slots per unit of time for the respective uplink channel is the same for all of the subscriber units S$_1$, S$_2$, S$_3$, S$_4$, S$_5$, and S$_6$I If all other transmission characteristics (i.e., coding rates, modulation rates, power level, etc.) are equal, then all of the subscriber units achieve the same overall uplink transmission rate.

In the case of multi-carrier modulation wireless communications systems, the subscriber units can be allocated contiguous or interleaved frequency channels. Contiguous or interleaved frequency channels can be allocated because the sub-carriers in a multi-carrier system such as in an OFDM (Orthogonal Frequency Division Multiplexing) system are orthogonal to each other.

In an embodiment, the available channel bandwidth (i.e., the 2 MHz channel shown in FIG. 3) is divided into three contiguous sub channels. In an alternative embodiment, the available channel bandwidth is divided into three sub-channels with interleaved tones.

In an embodiment, the allocation of best-suited tones for each sub-channel is carried out to achieve diversity gain in a multi-path fading communication channel.

In an embodiment, the technique for adapting a wireless communications link is applied to a fixed wireless access (FWA) communications system. In an FWA application, the channel adaptations are done less frequently, for example, during initial installation of the subscriber unit and/or at the start of each data communication session. In an embodiment, during initial installation and/or at the start of each data communications session, a portion of the available RF bandwidth, that enables the desired channel quality to be met for uplink communications, is selected. Because FWA systems have fixed locations, the signal-to-noise ratio changes less frequently than it does with mobile subscriber units. In FWA applications, a subscriber unit can be generally associated with a value of SNR and the base station can keep a database of this information in order to select the best uplink bandwidth. The signal-to-noise ratios of the subscriber units can be updated, for example, during start of each data communication session.

In an embodiment, the channel adaptation system and method are applied to a wireless link that utilizes spatial multiplexing. More detailed descriptions of spatial multiplexing are found in U.S. Pat. Nos. 5,345,599 and 6,067,290 both of which are incorporated by reference herein.

What is claimed is:

1. A method for adapting a wireless communications link between a transmitter and a receiver wherein information is communicated in a downlink direction from a base transceiver station to multiple subscriber units and in an uplink direction from said multiple subscriber units to said base transceiver station comprising:

establishing a radio frequency (RF) bandwidth as a communications channel in a wireless communications system;

establishing a desired channel quality for uplink communications between said transmitter and said receiver over said communications channel;

reducing said RF bandwidth of said communications channel for uplink communications to achieve said desired channel quality;

allocating additional uplink time slots for uplink communications over said communications channel with said reduced RF spectrum to maintain a desired uplink transmission rate between said transmitter and said receiver over said communications channel with said reduced RF spectrum; and taking time slots from other uplink communications channels to compensate for said additional uplink time slots that are allocated to said uplink communications channel with said reduced RF spectrum.

2. The method of claim 1 wherein reducing said RF spectrum is preceded by:

determining a current channel quality for uplink communications between said transmitter and said receiver over said communications channel;

utilizing all of said RF bandwidth of said communications channel for uplink communications if said current channel quality meets said desired channel quality; and reducing said RF spectrum of said communications channel to achieve said desired channel quality and utilizing said reduced RF spectrum of said communications channel for uplink communications if said current channel quality does not meet said desired channel quality.

3. The method of claim 2 further including:

indicating to said transmitter, the frequency range of the reduced RF spectrum that is to be used for subsequent uplink transmissions; and indicating changes in time slot allocations as a result of the uplink channel with the reduced RF spectrum.

4. The method of claim 1 further including utilizing time division duplexing for downlink and uplink communications.

5. The method of claim 1 wherein the RF spectrum for downlink communications is greater than the RF spectrum for uplink communications.

6. The method of claim 1 wherein reducing said RF spectrum includes:

dividing said RF spectrum into uplink sub-channels; and assigning at least one of said uplink sub-channels to said transmitter for uplink communications.

7. The method of claim 6 wherein dividing said RF spectrum into uplink sub-channels includes dividing said RF spectrum into n uplink sub-channels of equal size, where n is an integer.

8. The method of claim 6 further including:

establishing a desired signal-to-noise ratio as said desired channel quality for uplink communications; and assigning a number, m, of uplink sub-channels to said communications channel such that said desired signal-to-noise ratio is met for uplink communications, wherein m is an integer.

9. The method of claim 6 further including:

establishing a desired signal-to-noise ratio as said desired signal-to-noise ratio as said channel quality for uplink communications; and assigning a number, m, of uplink sub-channels to said communications channel such that said desired signal-to-noise ratio is met for uplink communications, wherein m is an integer.

10. The method of claim 9 further including allocating additional time slots for uplink communications to maintain a constant uplink transmission rate.

11. The method of claim 10 further including utilizing time division duplexing to communicate in the uplink and downlink directions.

12. The method of claim 1 further including indicating, to said transmitter, the frequency range of the reduced RF spectrum allocated to the communications channel that is to be used for subsequent transmissions.

13. A method for adapting a wireless communications link between a transmitter and a receiver wherein information is communicated in a downlink direction from a base transceiver station to multiple subscriber units and in an uplink direction from said multiple subscriber units to said base transceiver station comprising:
   identifying a radio frequency (RF) spectrum that is available for use as a communications channel in a wireless communications system;
   establishing a desired channel quality for uplink communications between said transmitter and said receiver over said communications channel;
   selecting a portion of said RF spectrum that enables said desired channel quality to be met for uplink communications;
   allocating additional uplink time slots for uplink communications over said communications channel to maintain a desired uplink transmission rate between said transmitter and said receiver over said communications channel;
   indicating to said transmitter, the frequency range of said selected portion of said RF spectrum that is to be used for subsequent uplink transmissions; and
   indicating changes in time slot allocations to said transmitter.

14. The method of claim 13 wherein selecting a portion of said RF spectrum is preceded by:
   determining a current channel quality for uplink communications between said transmitter and said receiver over said communications channel;
   utilizing all of said RF spectrum of said communications channel for uplink communications if said current channel quality meets said desired channel quality; or
   reducing said RF spectrum of said communications channel to achieve said desired channel quality and utilizing said reduced RF spectrum of said communications channel for uplink communications if said current channel quality does not meet said desired channel quality.

15. The method of claim 13 further including taking time slots from other uplink communications channels to compensate for said additional uplink time slots that are allocated to said uplink communications channel.

16. The method of claim 13 further including utilizing time division duplexing for downlink and uplink communications.

17. The method of claim 16 wherein the RF spectrum for downlink communications is greater than the RF spectrum for uplink communications.

18. The method of claim 13 wherein selecting a portion of said RF spectrum includes:
   dividing said RF bandwidth into uplink sub-channels; and
   assigning at least one of said uplink sub-channels to said transmitter for uplink communications.

19. The method of claim 18 wherein dividing said RF spectrum into uplink sub-channels includes dividing said RF spectrum into n uplink sub-channels of equal RF spectrum size, where n is an integer.

20. The method of claim 18 further including:
   establishing a desired signal-to-noise ratio as said desired channel quality for uplink communications; and
   assigning a number, m, of uplink sub-channels to said communications channel such that said desired signal-to-noise ratio is met for uplink communications, wherein m is an integer.

21. The method of claim 18 further including:
   establishing a desired signal-to-noise ratio as said desired channel quality for uplink communications; and
   assigning a number of uplink sub-channels to said communications channel such that said desired signal-to-noise ratio is met for uplink communications.

22. The method of claim 21 further including allocating additional time slots for uplink communications to maintain a constant uplink transmission rate.

23. The method of claim 22 further including utilizing time division duplexing to communicate in the uplink and downlink directions.

24. The method of claim 13 further including indicating, to said transmitter, the frequency range of said selected portion of said RF spectrum that is to be used for subsequent transmissions.

25. A method for adapting a wireless communications link between a transmitter and a receiver wherein information is communicated in a downlink direction from a base transceiver station to multiple subscriber units and in an uplink direction from said multiple subscriber units to said base transceiver station comprising:
   establishing a radio frequency (RF) spectrum as a communications channel in a wireless communication system;
   establishing a desired channel quality for uplink communications between said transmitter and said receiver over said communications channel;
   reducing said RF spectrum of said communications channel for uplink communications to achieve said desired channel quality;
   wherein reducing said RF spectrum includes:
   dividing said RF spectrum into uplink sub-channels; and
   assigning at least one of said uplink sub-channels to said transmitter for uplink communications;
   establishing a desired signal-to-noise ratio as said desired channel quality for uplink communications; and
   assigning a number, m, of uplink sub-channels to said communications channel such that said desired signal-to-noise ratio is met for uplink communications, wherein m is an integer.

26. A method for adapting a wireless communications link between a transmitter and a receiver wherein information is communicated in a downlink direction from a base transceiver station to multiple subscriber units and in an uplink direction from said multiple subscriber units to said base transceiver station comprising:
   identifying a radio frequency (RF) spectrum that is available for use as a communications channel in a wireless communications system;
   establishing a desired channel quality for uplink communications between said transmitter and said receiver over said communications channel;
   selecting a portion of said RF spectrum that enables said desired channel quality to be met for uplink communications;
   dividing said RF spectrum into uplink sub-channels;
   assigning at least one of said uplink sub-channels to said transmitter for uplink communications;
   establishing a desired signal-to-noise ratio as said desired channel quality for uplink communications; and
   assigning a number of uplink sub-channels to said communications channel such that said desired signal to noise ratio is met for uplink communications.

* * * * *